US011203171B2

(12) United States Patent
Bonfiglioli

(10) Patent No.: US 11,203,171 B2
(45) Date of Patent: Dec. 21, 2021

(54) SHEAR PRESS WITH IMPROVED JAWS

(71) Applicant: ACHA S.R.L., Bologna (IT)

(72) Inventor: Cesare Bonfiglioli, Castello d'Argile (IT)

(73) Assignee: ACHA S.RL., Bologna (IT)

( * ) Notice: Subject to any disclaimer, the term of this patent is extended or adjusted under 35 U.S.C. 154(b) by 0 days.

(21) Appl. No.: 16/650,044

(22) PCT Filed: Aug. 28, 2018

(86) PCT No.: PCT/IB2018/056541
§ 371 (c)(1),
(2) Date: Mar. 24, 2020

(87) PCT Pub. No.: WO2019/064085
PCT Pub. Date: Apr. 4, 2019

(65) Prior Publication Data
US 2020/0230906 A1    Jul. 23, 2020

(30) Foreign Application Priority Data

Sep. 27, 2017   (IT) ........................ 102017000108265

(51) Int. Cl.
*B30B 9/32*        (2006.01)
*B30B 15/26*       (2006.01)
(Continued)

(52) U.S. Cl.
CPC ............ *B30B 9/326* (2013.01); *B23D 31/008* (2013.01); *B30B 15/068* (2013.01)

(58) Field of Classification Search
CPC ........... B30B 9/32; B30B 9/322; B30B 9/323; B30B 9/326; B30B 9/327; B30B 9/3078;
(Continued)

(56) References Cited

U.S. PATENT DOCUMENTS 2,960,928 A    11/1960   Anderson
4,018,169 A *  4/1977    Schmalz ................. B30B 9/301
                                                       100/39

(Continued)

FOREIGN PATENT DOCUMENTS

CA        684261 A    4/1964
DE      1427154 A1    7/1969
(Continued)

*Primary Examiner* — Jimmy T Nguyen
(74) *Attorney, Agent, or Firm* — Browdy and Neimark, PLLC

(57) ABSTRACT

A shear press for scrap including a machine body defining a compaction channel to contain the scrap and guide it in a sliding manner along a predetermined advance direction a compaction unit and blades. The compaction unit includes two mutually opposed jaws articulated to the machine bod according to axes of rotation parallel to each other and orthogonal to the advance direction of the scrap, and actuating members to rotate the jaws around the respective axes of rotation, in opposite directions, between an open configuration and a closed configuration. Each aw includes an operating surface to laterally de-limit the compaction channel when the jaw is in open configuration. The extreme point of a first rectilinear stretch with respect to the axis of rotation of the jaw is aligned to the latter along a direction of alignment which forms, with the first rectilinear stretch, an angle having its vertex facing the inner part of the compaction channel.

14 Claims, 6 Drawing Sheets

(51) Int. Cl.
*B23D 31/00* (2006.01)
*B30B 15/06* (2006.01)

(58) Field of Classification Search
CPC . B30B 15/068; Y10S 100/901; B23D 31/008; B23D 33/02
See application file for complete search history.

(56) References Cited

U.S. PATENT DOCUMENTS

| | | | | |
|---|---|---|---|---|
| 4,188,876 | A | * | 2/1980 | Graves ................. B30B 7/04 100/232 |
| 4,552,062 | A | * | 11/1985 | Vezzani ................ B30B 9/326 100/95 |
| 4,660,469 | A | | 4/1987 | Smith et al. |
| 4,782,748 | A | * | 11/1988 | Betsinger ........... B23D 31/008 100/100 |

FOREIGN PATENT DOCUMENTS

| | | |
|---|---|---|
| EP | 0458059 A1 | 11/1991 |
| EP | 1247581 A2 | 10/2002 |
| EP | 1449608 A2 | 8/2004 |

\* cited by examiner

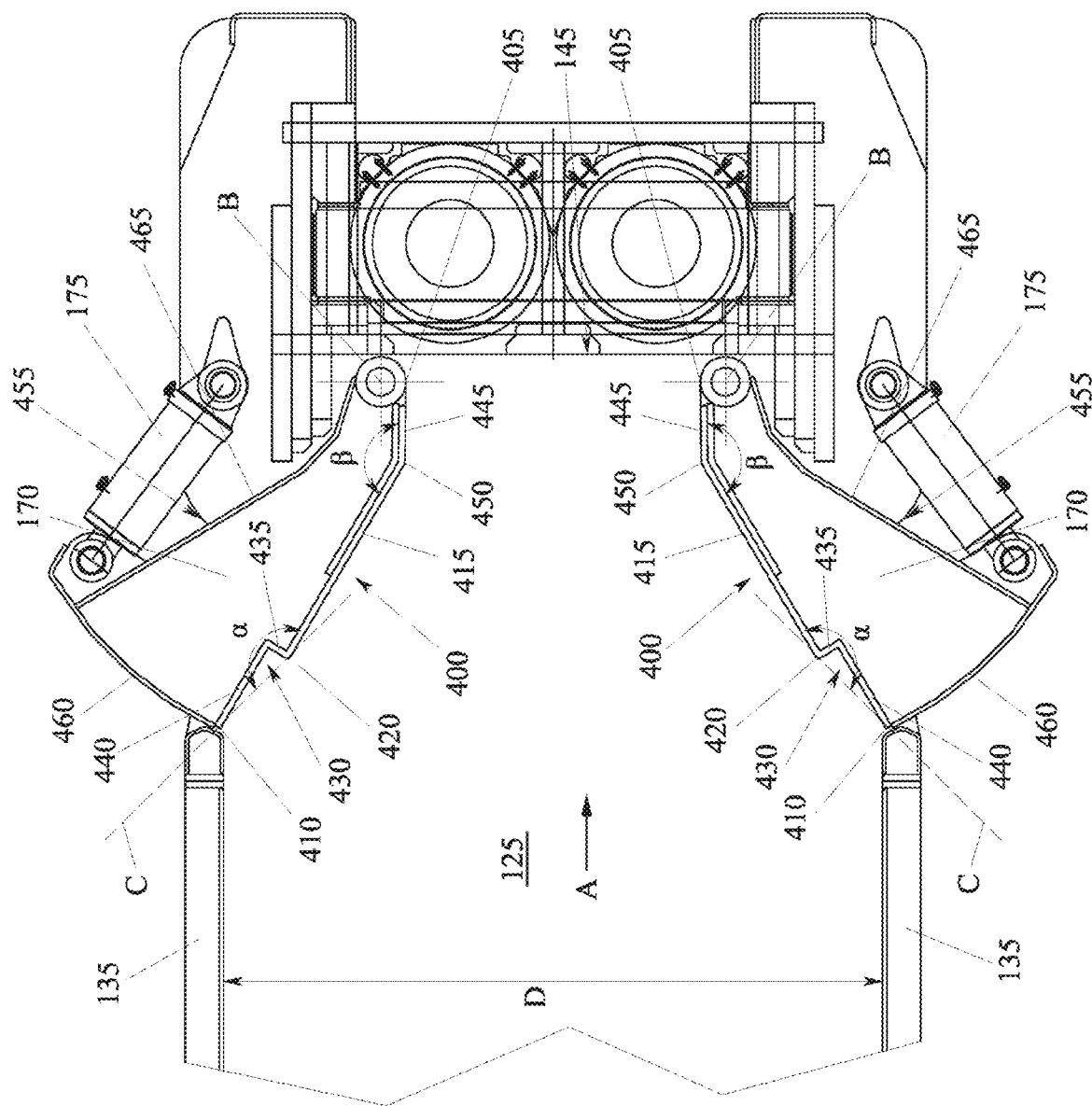

SHEAR PRESS WITH IMPROVED JAWS

FIELD OF THE INVENTION

The present invention relates to a shear press for scrap, typically but not exclusively for metal scrap, which is adapted to cut a mass of scrap, even of significant size, such as automotive bodywork or other scrap, into smaller portions of pressed scrap.

BACKGROUND ART

As is known, a shear press generally comprises a machine body defining, at its inner part, a compaction channel adapted to contain the scrap to be treated and guide it in a sliding manner along a predetermined advance direction. In order to allow the advance of the scrap, the compaction channel may be inferiorly delimited by an inclined bottom plane, which is adapted to define a sort of slide that allows the scrap to slide downwards simply by the effect of gravity.

By sliding within the compaction channel, the scrap is first pressed by suitable compaction means and then subjected to the action of cutting means, generally shaped as a shear or guillotine, which are positioned at an axial end of the compaction channel and are adapted to divide the compacted scrap into smaller portions.

The compaction means generally include an upper punch acting in a direction orthogonal to the bottom plane of the compaction channel and a pair of mutually opposed jaws arranged along the sides of the compaction channel and acting in the transverse direction.

These jaws are both articulated to the machine body according to rotation axes parallel and orthogonal to the advance direction of the scrap and are actuated in rotation, typically through corresponding hydraulic jacks, simultaneously and in opposite directions, from an open configuration to a closed configuration, so as to tighten and compact the mass of scrap interposed between them.

More in particular, each jaw normally includes an operating surface, extending substantially orthogonal to the bottom plane of the compaction channel, which is facing towards the operating surface of the other jaw and is adapted to laterally delimit the compaction channel when the jaw is in open configuration.

By rotating towards the closed configuration, this operating surface progressively moves towards the middle of the compaction channel, pressing the scrap against the surface of the other jaw and thus causing the compaction thereof.

At present, the cross section of each of these operating surfaces, carried out with respect to a plane orthogonal to the respective axis of rotation, has one end proximal to the axis of rotation, one end distal from the axis of rotation and a long rectilinear stretch which extends from the distal end almost up to the proximal end.

When the jaws are in closed configuration, the rectilinear stretches of their operating surfaces are mutually approached and both parallel to the advance direction of the scrap.

Conversely, when the jaws are in open configuration, the rectilinear stretches of their operating surfaces are both inclined with respect to the advance direction of the scrap, so as to be mutually converging towards the cutting means.

The degree of inclination of the rectilinear stretches, which coincides with the angular stroke of the jaws from the closed configuration to the open configuration is generally quite limited to avoid that the jaws, during the rotation towards the closed configuration, instead of pressing the scrap may tend to push it back along the compaction channel.

However, due to the current geometry of the jaws, this degree of inclination also determines the distance between the distal ends of the two jaws in open configuration, and thus the maximum width of the compaction channel, thus limiting the maximum dimensions of the scrap that can be treated by the shear press.

In fact, since the degree of inclination cannot be increased, the only way to increase the maximum width of the compaction channel would be to increase the length of the jaws, or the distance between their distal end and the axis of rotation, but this would require an extensive redesign and modification of the whole shear press.

DESCRIPTION OF THE INVENTION

In the light of the foregoing, an object of the present invention is to provide a solution that allows the maximum width of the compaction channel to be increased, without modifying the angular stroke of the jaws or their length.

A further object is to achieve the above object with a simple, rational and relatively cost-effective solution.

These and other objects are achieved with the features of the invention set out in the independent claim 1. The dependent claims describe preferred and/or particularly advantageous aspects of the invention.

Going in more detail, an embodiment of the present invention provides a shear press for scrap comprising a machine body defining a compaction channel adapted to contain the scrap and guide it in a sliding manner along a predetermined advance direction, compaction means adapted to compact the scrap into the compaction channel, and cutting means positioned at an axial end of the compaction channel to separate the compacted scrap into portions, wherein the compaction means comprise:
two mutually opposed jaws articulated to the machine body according to axes of rotation parallel to each other and orthogonal to the advance direction of the scrap, and
actuating members adapted to rotate said jaws around the respective axes of rotation, in opposite directions, between an open configuration and a closed configuration, thereby reducing the space between the two jaws,
wherein each jaw comprises an operating surface adapted to laterally de-limit the compaction channel when the jaw is in the open configuration, and
wherein the cross section of said operating surface, carried out with respect to a section plane orthogonal to the axis of rotation, comprises an end proximal to the axis of rotation, an end distal from the axis of rotation and at least one first rectilinear stretch that is parallel to the advance direction (A) of the scrap when the jaw is in the closed configuration.

According to the present invention, the extreme point of said first rectilinear stretch with respect to the axis of rotation of the jaw does not, however, coincide with the distal end of the cross section of the operating surface but is aligned to the latter along a direction of alignment which forms, with said first rectilinear stretch, an angle having its vertex facing the inner part of the compaction channel.

With this solution, the maximum width of the compaction channel, coincident with the distance between the distal ends of the two jaws in open configuration, is no longer solely determined by the angular stroke and by the length of the jaws, but also depends on the angle formed by the first rectilinear stretch and by the direction of alignment between the extreme point of the first rectilinear stretch and the distal end.

Therefore, by suitably selecting the above angle, it is advantageously possible to increase the maximum width of the compaction channel, without modifying the angular stroke of the two jaws or their overall length.

According to an embodiment of the invention, the cross section of the operating surface may comprise a second rectilinear stretch extending, along said direction of alignment, from the extreme point of the first rectilinear stretch to the distal end of the cross section of the operating surface.

In this way, the overall shape of the jaws is quite simple and can be implemented in relatively cost-effective manner.

According to a different embodiment of the invention, the cross section of the operating surface may however comprise a concave profile extending, with concavity facing the inner part of the compaction channel, from the extreme point of the first rectilinear stretch to the distal end of the cross section of the operating surface.

While this aspect of the invention provide a jaw with relatively more complex shape, the presence of a concave profile, rather than a simple rectilinear stretch, may be improving in terms of effectiveness of the compaction step. In this context, one aspect of the invention provides that the above concave profile may comprise at least two mutually inclined rectilinear stretches, one of which may extend parallel to the first rectilinear stretch while the other may extend perpendicular to the first rectilinear stretch.

With this solution, the concave profile is substantially step-shaped, which allows achieving a good compromise between construction simplicity and effectiveness of the compaction step.

According to one aspect of the invention, common to all the embodiments outlined above, the angle formed by the first rectilinear stretch and by the direction of alignment jointing the extreme point of the first rectilinear stretch and the distal end of the cross section of the operating surface may be of between 160° and 170° (sexagesimal), for example about 165° (sexagesimal). In this way, it is advantageously possible to increase the maximum width of the compaction channel, without creating a barrier to the flow of the scrap along the advance direction.

Another aspect of the invention provides that the distance between the extreme point of the first rectilinear stretch and the distal end of the cross section of the operating surface may be smaller than the length of the first rectilinear stretch, for example between 20% and 50% of the length of the first rectilinear stretch.

In this way, the actual compaction step continues to be carried out mainly by the first rectilinear stretch, while the portion of the operating surface that contains the distal end, in addition to increasing the maximum width of the compaction channel, mainly carries out the function of guiding the scrap in the space between the two jaws.

According to a different aspect of the invention, the cross section of the operating surface may comprise a further rectilinear stretch that extends from the first rectilinear stretch to the proximal end of the cross section of the operating surface, and which is parallel to the advance direction of the scrap when the jaw is in open configuration.

In this way, during the rotation of the jaw towards the closed configuration, this further rectilinear stretch generates a thrust according to the advance direction of the scrap, facilitating the sliding thereof towards the cutting means.

Another aspect of the invention provides that the first rectilinear stretch and said additional rectilinear stretch can be mutually inclined at an angle of 145° and 155° (sexagesimal), such as about 150° (sexagesimal).

This aspect implies that the angular stroke of the jaws remains within values that allows an effective compaction of the scrap.

BRIEF DESCRIPTION OF THE DRAWINGS

Further features and advantages of the invention will become apparent from the following description, provided by way of non-limiting example with the aid of the figures shown in the accompanying drawings.

FIGS. 5 and 6 correspond to the sections in FIGS. 3 and 4, respectively, but referred to an alternative embodiment of the invention.

DETAILED DESCRIPTION

Figure 1:
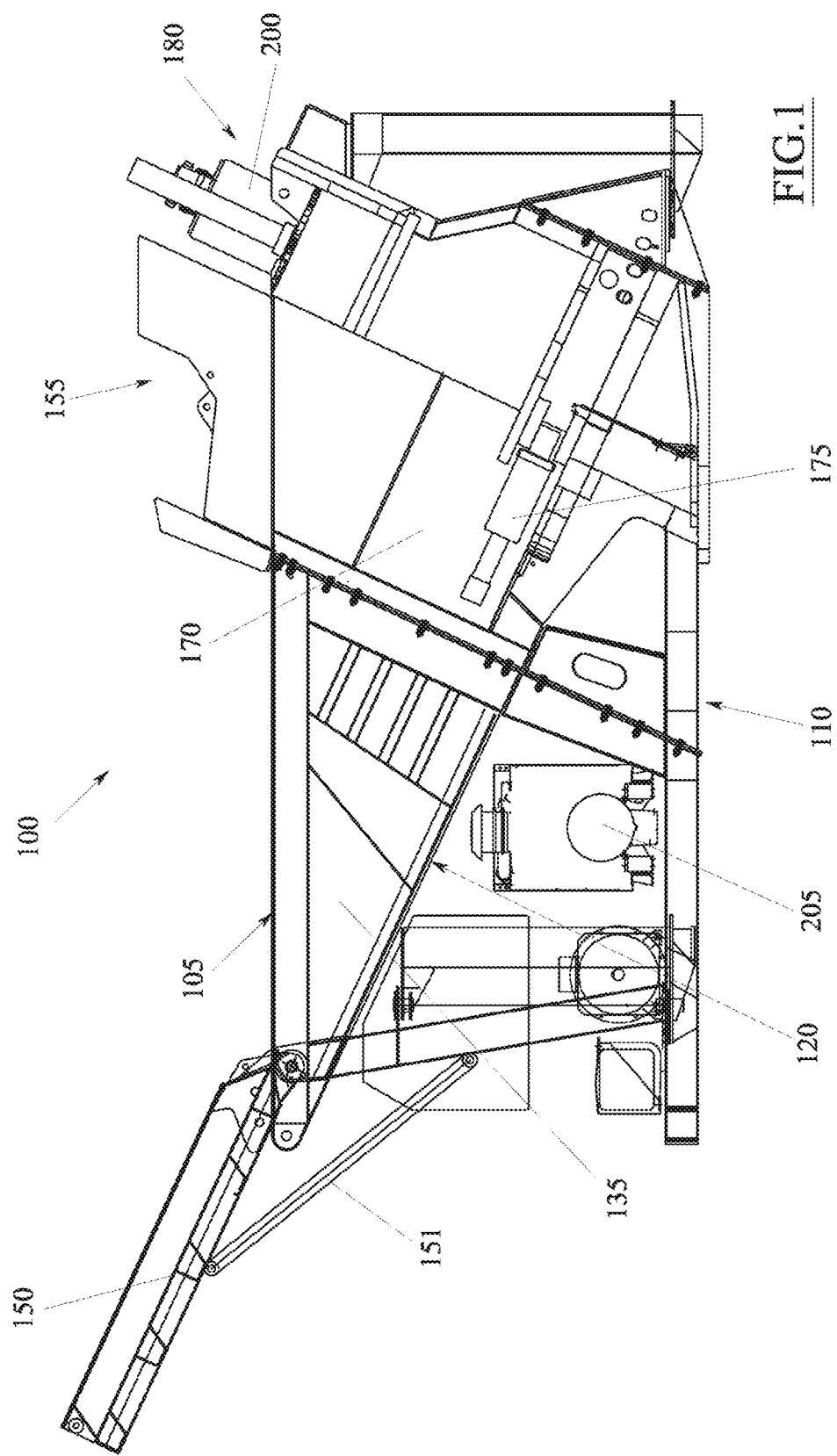
FIG. 1 is a side view of a shear press according to an embodiment of the present invention.

FIG. 1 shows a shear press 100 adapted to cut a mass of scrap into portions of pressed scrap.

In particular, the shear press 100 may be a large machine and may be structured so as to be able to treat even very bulky scrap, such as automotive bodywork or other scrap.

The shear press 100 comprises a machine body, designated as a whole with reference numeral 105, which is provided with a base 110 adapted to be arranged substantially horizontally when the machine body 105 is rested on the ground.

Figure 2:
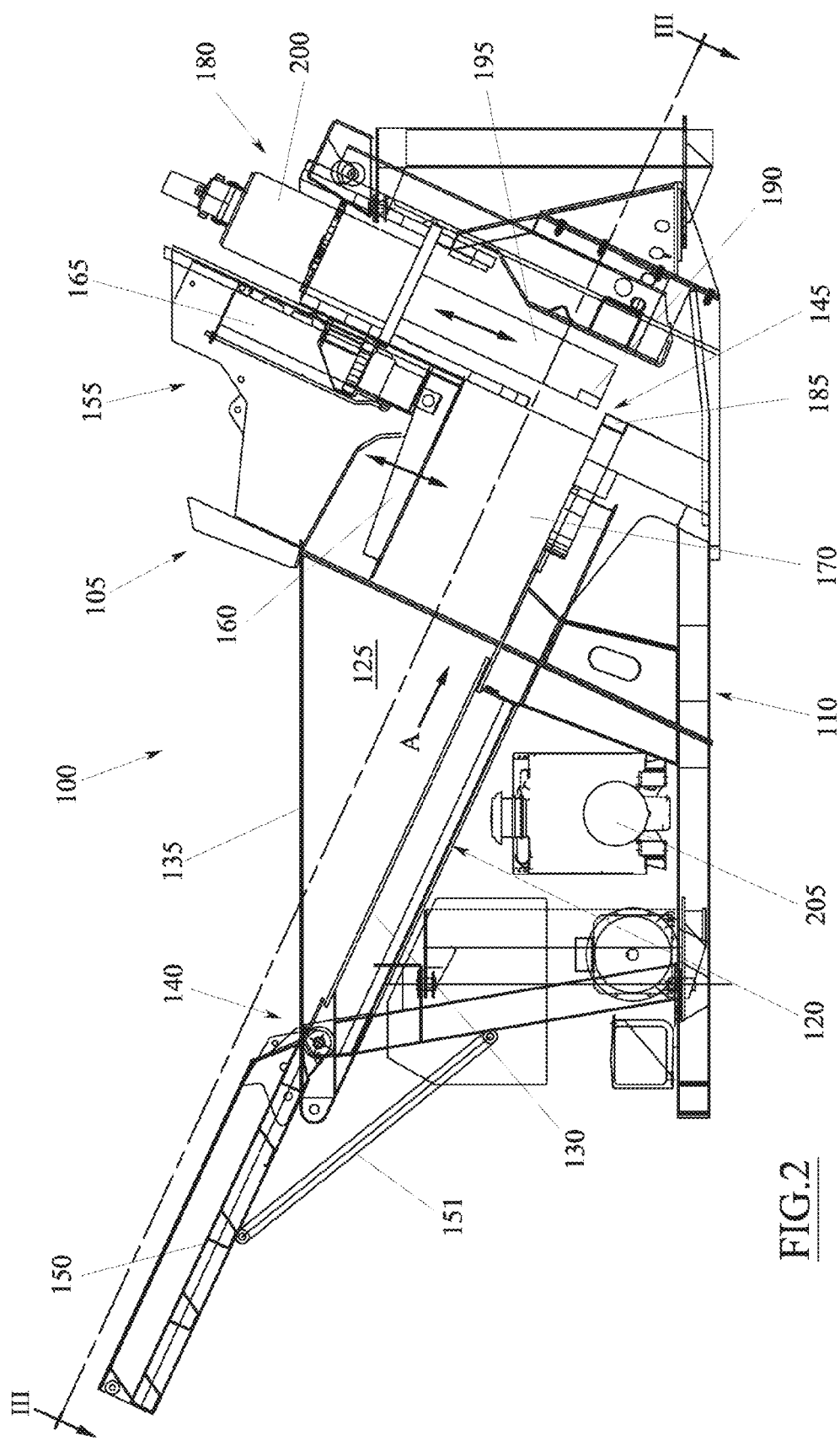
FIG. 2 is section II-II of the shear press as shown in FIG. 3.

For example, the base 110 may be put in direct contact with the ground or kept raised through the interposition of other intermediate support structures. The machine body 105 further comprises an upper structure 120, generally shaped as a body, which is firmly anchored above the base 110 and defines at its inner part a compaction channel 125 for the scrap (see FIG. 2).

The compaction channel 125 is inferiorly delimited by a bottom plane 130, which may consist of one or more monolithic plates arranged mutually parallel and in succession.

The bottom plane 130 may be inclined with respect to the base 110 of the machine body 105, so as to form an acute angle with the latter, the value of which may for example be in the range of 20° and 30°, preferably about equal to 25°.

In particular, the bottom plane 130 may be inclined for the top downwards starting from an upper end 140, which is placed at a maximum height with respect to the base 110, towards a lower end 145, which is placed at a minimum height with respect to the base 110.

In this way, the bottom plane 130 defines a sort of slide that allows the scrap to slide, by the effect of gravity, from the upper end 140 towards the lower end 145, along a predetermined advance direction indicated with A.

At the upper end 140, a platform 150 may be articulated to the machine body 105 which, actuated by hydraulic jacks 151, may rotate between a lowered position (not shown in the figures) and a raised position, in which it lies substantially coplanar to an extension of the bottom plane 130.

The initial portion of the compaction channel 125, i.e. that proximal to the upper end 140, is open at the top and is bounded by two opposed side walls 135 (see FIG. 3), so as to define a sort of loading hopper for the scrap to be treated.

At a subsequent end portion of the compaction channel 125, i.e. that proximal to the lower end 145, the machine body 105 is associated to compaction means, globally designated with reference numeral 155, which are adapted to press the scrap within said end portion of the compaction channel 125. Downstream of these compaction means, with respect to the advance direction A, the shear press 100 finally comprises cutting means 180 adapted to separate the pressed scrap into portions.

These cutting means 180 may comprise a first blade 185 (see FIG. 2), which is fixed along the edge of the bottom plane 130, at the lower end 145, and collaborates with a second blade 190, which is carried by a support crosspiece 195 placed immediately downstream of the compaction channel 125 with respect to the advance direction A of the scrap.

The support crosspiece 195 is coupled to the machine body 105, for example to a portal structure of the machine body 105, so as to slide with reciprocating motion in a direction orthogonal to the bottom plane 130.

Due to this movement, the first and the second blade 185 and 190 form a shear or guillotine device, which is adapted to cut the compacted scrap progressively exiting from the lower end 145 of the compaction channel 125.

The movement of the support crosspiece 195 is implemented through one or more hydraulic cylinders jacks 200, which are installed on the machine body 105 and from which they can protrude upwards.

Going back to the compaction means 155, these means may comprise an upper punch 160 which surmounts the background bottom plane 130 of the compaction channel 125 and is coupled to the machine body 105 so as to be adapted to move with reciprocating motion in a direction orthogonal to the bottom plane 130, in order to press the scrap against the latter.

The movement of the upper punch 160 is implemented through one or more hydraulic cylinders jacks 165, which are installed on the machine body 105 from which they can protrude upwards.

The compaction means 155 further comprise a pair of side jaws 170 (see FIG. 3), each of which may be positioned on the same side as, and immediately downstream of, a respective side wall 135 of the compaction channel 125. The jaws 170 are arranged substantially in contact above the bottom plane 130 and are mutually opposed transversally with respect to the advance direction A of the scrap.

In particular, the jaws 170 may be identical to each other and may be arranged in a mirror manner mage with respect to a median plane of the compaction channel 125, i.e. a theoretical plane passing through the center of the compaction channel 125, perpendicular to the bottom plane 130 and parallel to the advance direction A.

Each jaw 170 is articulated to the machine body 105 according to a respective axis of rotation B, which is orthogonal to the advance direction A of the scrap and is parallel to the axis of rotation B the other jaw 170.

Preferably, the axes of rotation B of the two jaws 170 are both perpendicular to the bottom plane 130 and are placed at the lower end 145 of the latter, where they are mutually separated by a distance that is smaller than the distance separating the side walls 135.

Starting from the respective axis of rotation B, each jaw 170 extends mainly in the opposite direction with respect to the advance direction A of the scrap, so as to achieve a certain continuity with the side wall 135 adjacent thereto. The two jaws 170 are associated with actuating means adapted to rotate them around the respective axes of rotation B, in opposite directions, between an open configuration (shown in FIG. 4), in which the space between the two jaws 170 is maximum, and a closed configuration (shown in FIG. 3), in which the space between the two jaws 170 is minimal, so as to transversely compress the scrap interposed therebetween.

Preferably, the rotation of the two jaws 170 is implemented simultaneously, at the same speed and for the same time so that, by switching from the open to the closed configuration or vice versa, both jaws 170 carry out the same angular stroke.

In the example shown, the actuators comprise two hydraulic jacks 175, each of which is placed outside the compaction channel 125 and is associated with a respective jaw 170.

Each jaw 170 comprises an operating surface, globally designated with reference numeral 400 in the figures, which extends perpendicular to the bottom plane 130 and faces towards the operating surface 400 of the other jaw 170. In particular, the operating surfaces 400 of the two jaws 170 are those that, when the jaws 170 are in the open configuration, are adapted to laterally de-limit the compaction channel 125 (see FIG. 4) and which as a result of the rotation of the jaws 170 towards the closed configuration (see FIG. 3), are adapted to press the scrap.

Figure 3:
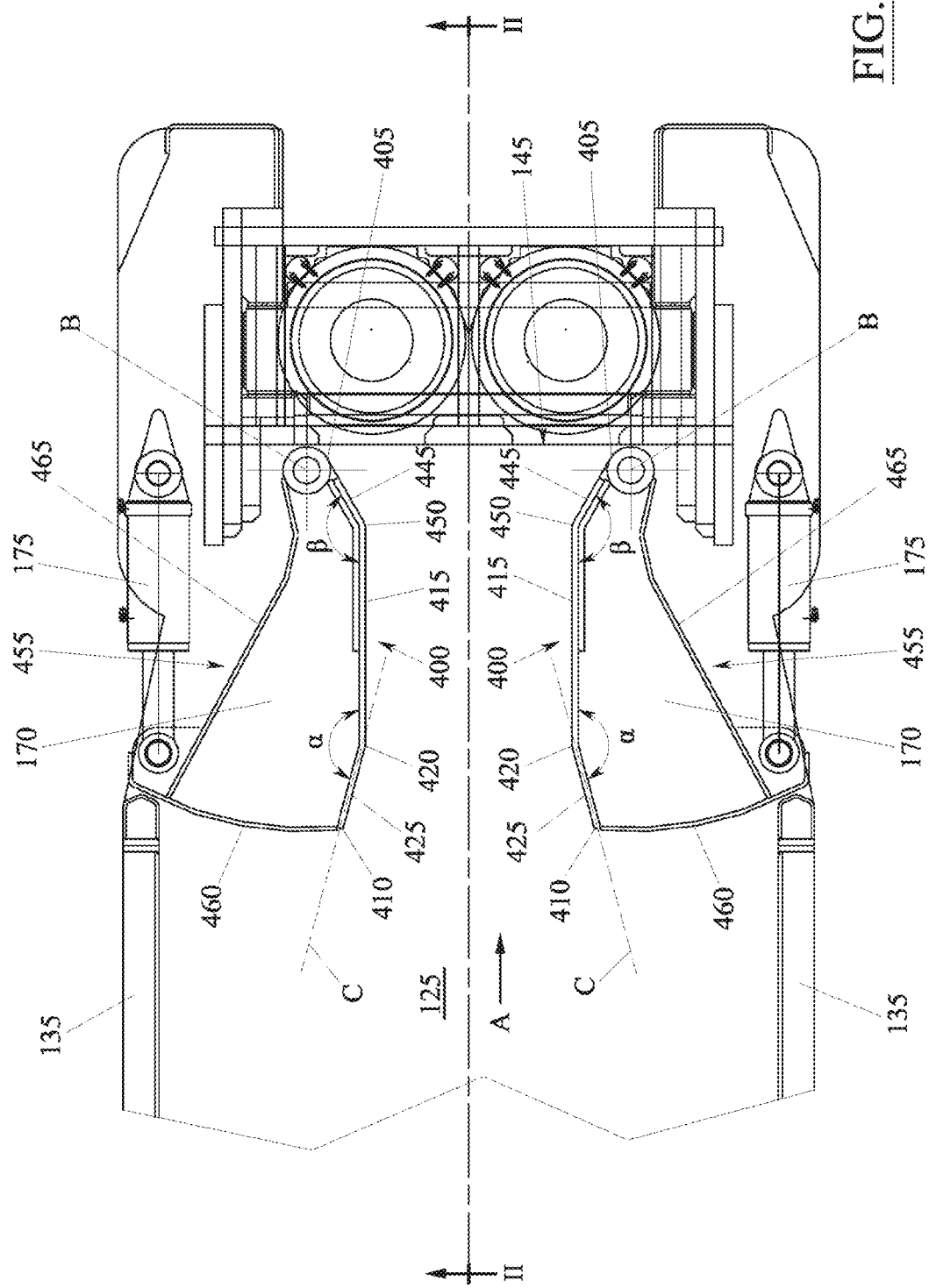
FIG. 3 is a partial section of the shear press taken according to plane III-III shown in FIG. 2 and which shows the jaws in closed configuration.
Figure 4:
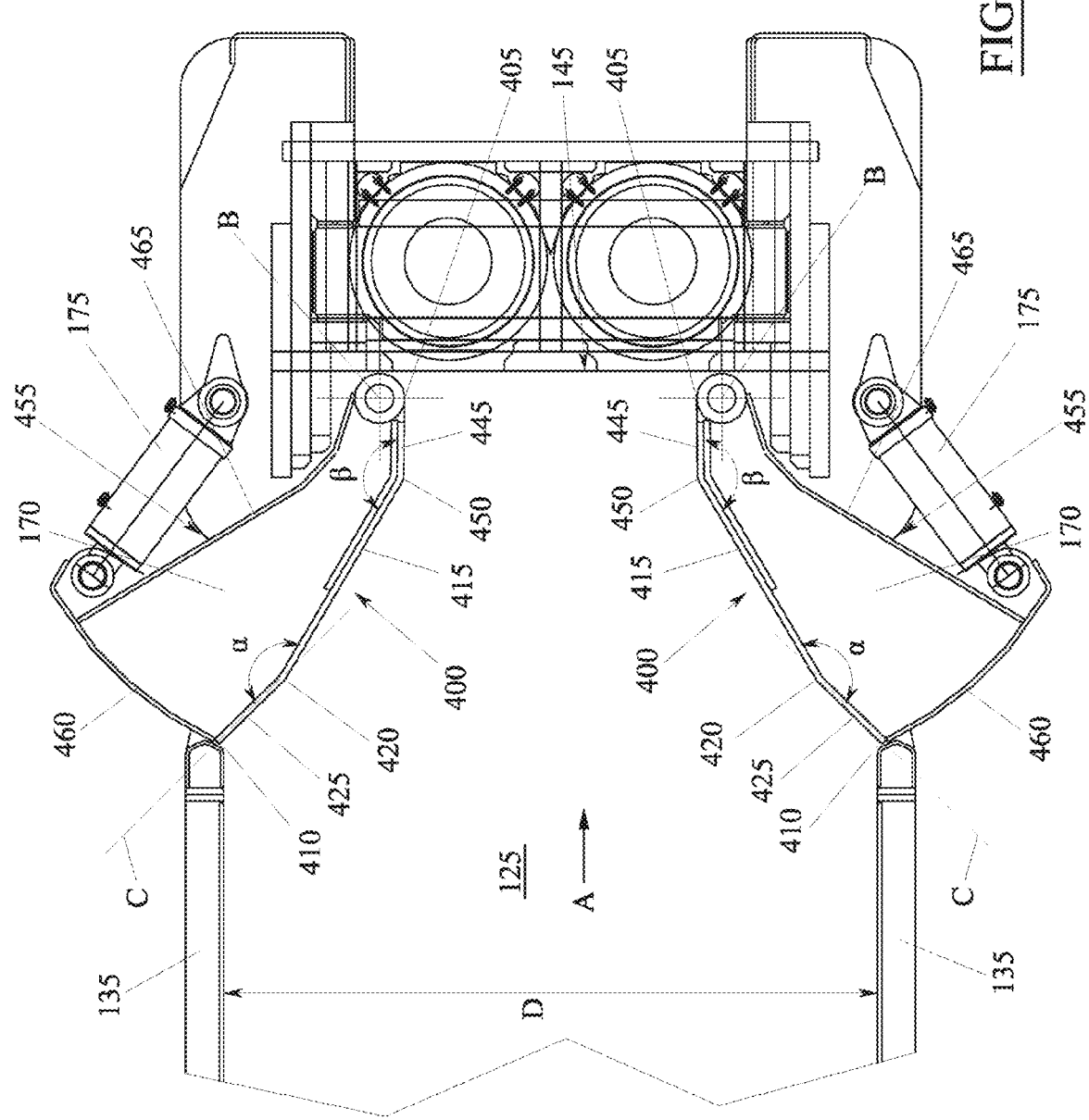
FIG. 4 is a partial section of FIG. 3 which shows the jaws in open configuration.

As shown in FIGS. 3 and 4, the cross section of each of these operating surfaces 400, carried out with respect to a plane orthogonal to the axis of rotation B, has an end 405 proximal to the axis of rotation B (i.e. placed at the shortest distance from the axis of rotation B) and an end 410 distal from the axis of rotation B (i.e. placed at the maximum distance from the axis of rotation B).

When the jaws 170 are in the open configuration (see FIG. 4), the distal end 410 of the cross section of each operating surface 400 may be substantially aligned to the end edge of the corresponding side wall 135, with respect to the advance direction A of the scrap.

In this way, no evident steps or discontinuity is created between each side wall 135 and the operating surface 400 adjacent thereto which may hinder the advance of the scrap along the compaction channel 125.

Moreover, the distance between the distal end 410 and the axis of rotation B of each jaw 170 is preferably equal, or nearly equal, to the distance between the axis of rotation B and said end edge of the corresponding side wall 135, so as not to leave too large openings from which the scrap can escape outwards.

Between the distal end 410 and the proximal end 405, the cross section of each operating surface 400 comprises a first rectilinear stretch 415 which, when the respective jaw 170 is in the closed configuration (see FIG. 3), is parallel to the advance direction A of the scrap while, when jaw 170 is in the open configuration (see FIG. 4), is inclined with respect to the advance direction A by an angle equal to the angular stroke of jaw 170.

In this way, when the jaws 170 are in the open configuration, the two rectilinear stretches 415 are mutually converging towards the lower end 145 of the compaction channel 125.

In order to allow an effective pressing of the scrap, the angle of inclination of the first rectilinear stretch 415 (in the open configuration) is preferably comprised between 25° and 35° sexagesimal, for example about equal to 30° sexagesimal, with respect to the advance direction A.

According to the present invention, the extreme point 420 of the first rectilinear stretch 415 of each jaw 170, i.e. the point of the first rectilinear stretch 415 which is at the maximum distance from the axis of rotation B, does not coincide with the distal end 410, but is closer to the axis of rotation B and is angularly offset towards the inner part of the compaction channel 125 with respect to the distal end 410.

In more analytical terms, the extreme point 420 of the first rectilinear stretch 415 is aligned with the distal end 410 along a direction of alignment, designated with C in the figures, which with said first rectilinear stretch 415 forms an angle α having the vertex facing the inner part of the compaction channel 125.

Angle α may have a value of between 160° and 170° sexagesimal, for example equal to about 165° sexagesimal, and the distance between the extreme point 420 of the first rectilinear stretch 415 and the distal end 410 may be relatively small and generally smaller than the length of the first rectilinear stretch 415, for example between 20% and 50% of the length of the first rectilinear stretch 415.

Figure 5:
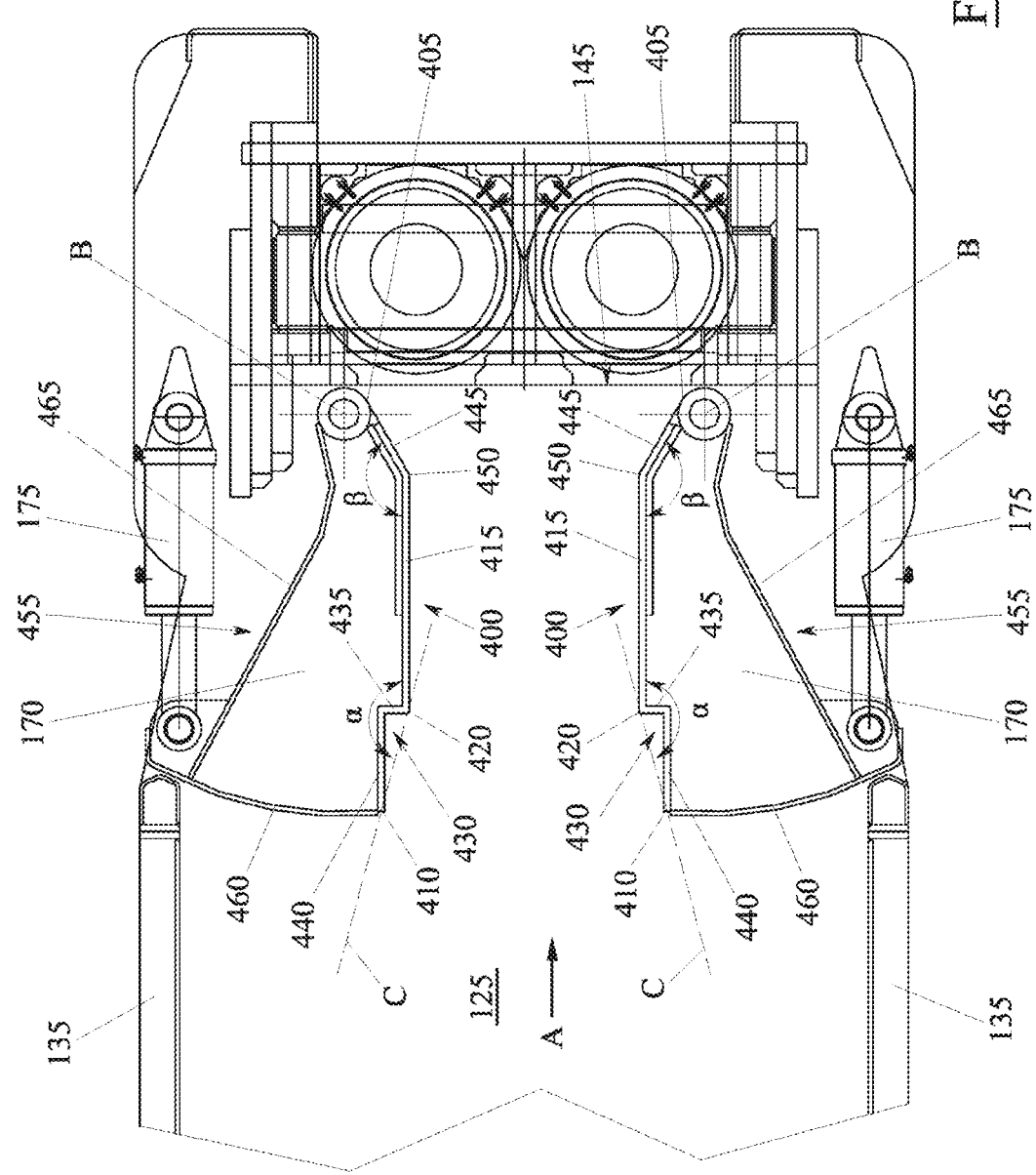

In order to obtain this geometry, the embodiment shown in FIGS. 3 and 4 provides that the cross section of the operating surface 400 of each jaw 170 simply comprises a second rectilinear stretch 425, which extends from the extreme point 420 of the first rectilinear stretch 415 up to the distal end 410 of the operating surface 400, following exactly the direction of alignment C. In the alternative embodiment shown in FIGS. 5 and 6, the cross section of the operating surface instead comprises a concave profile 430 which extends from the extreme point 420 of the first rectilinear stretch 415 up to the distal end 410 of the operating surface 400, facing its concavity towards the inner part of the compaction channel 125.

Specifically, this concave profile 430 may comprise two consecutive rectilinear stretches, of which an initial stretch 435 extending from the extreme point 420 of the first rectilinear stretch 415 perpendicular to the latter, and a final stretch 440 which, deriving from the initial stretch 435, runs extends parallel to the first rectilinear stretch 415 up to the distal end 410.

With both these solutions, with the same overall distance between the axis of rotation B and the distal end 410 of the operating surface 400 and with the same angular stroke, the jaws 170 described above may achieve a maximum opening D (see FIG. 4), i.e. the maximum distance between the distal ends 410 of the two jaws 170 in the open configuration, which is greater than the maximum opening achievable with conventional jaws, in which the distal end 410 of the operating surface 400 is commonly aligned with the rectilinear stretch 415 and coincides with its extreme point 420.

Since the maximum opening D of the jaws 170 substantially coincides with the maximum width of the compaction channel 125, in particular with the distance between the side walls 135, the jaws 170 described above allow increasing the width of the compaction channel 125, allowing larger scrap to be treated without totally modifying the structure of the shear press 100.

According to all the embodiments outlined above, the cross section of the operating surface 400 of each jaw 170 may comprise a further rectilinear stretch 445 which extends from the initial point 450 of the first rectilinear stretch 415 (i.e. from the point of the first rectilinear stretch 415 that is closer to the axis of rotation B) up to the proximal end 405 of the operating surface 400.

This further rectilinear stretch 445 is inclined with respect to the first rectilinear stretch 415, thus forming an angle β with the latter having the vertex facing the inner part of the compaction channel 125.

The length of said further rectilinear stretch 445 may be relatively small and generally smaller than the length of the first rectilinear stretch 415, for example of between 20% and 40% of the length of the first rectilinear stretch 415, and angle β may have a value of between 145° and 155° sexagesimal, for example equal to about 150° sexagesimal.

In particular, the value of the angle β may be selected so that said further rectilinear stretch 445 is parallel to the advance direction A of the scrap when the respective jaw 170 is in the open configuration.

In addition to the operating surface 400 described above, each jaw 170 also comprises a rear surface, globally designated with reference numeral 455 in the figures, which is adapted to remain outside the compaction channel 125, when the jaws 170 are in the open configuration.

The cross section of this rear surface 455, carried out with respect to a plane orthogonal of the axis of rotation B, has an arched stretch 460 which extends, starting from the distal end 410 of the operating surface 400, towards the exterior of the compaction channel 125 and having center of curvature coinciding with the axis of rotation B.

When the jaws 170 switch to the closed configuration, the arched stretch 460 is adapted to penetrate inside the compaction channel 125, whereby it preferably has an extension not smaller than the arc of circumference traveled by the distal end 410 during the rotation of the jaw 170 from the open configuration to the closed configuration.

Finally, the cross section of the rear surface 455 has a shaped profile 465 which, deriving from the arched stretch 460, completes the perimeter of the jaw 170, remaining always facing towards the exterior of the compaction channel 125.

In the light of the foregoing, the operation of the shear press 100 may be summarized as follows.

The scrap to be treated is loaded from above into the loading hopper defined by the initial portion of the compaction channel 125. Due to the inclination of the bottom plane 130, the scrap slides towards the end portion of the compaction channel 125, where it is subjected to the action of the compaction means 155. The mass of pressed scrap then continues to slide downwards, progressively exiting from the compaction channel 125 to be sheared and separated into smaller pieces by the cutting means 180.

The hydraulic jacks 165, 175 and 200 which actuate the compaction means 155 and the cutting means 180 are connected to a suitable water supply circuit, the operation of which is made possible by an engine 205, such as an internal combustion engine, which can be placed in the space between the base 110 and the portion of the compaction channel 125 which defines the loading hopper.

Of course, a man skilled in the art may make several technical application changes to the shear press 100 described above, without thereby departing from the scope of the invention as claimed hereinafter.

The invention claimed is:

1. A shear press for scrap comprising a machine body defining a compaction channel inferiorly delimited by a bottom plane and adapted to contain the scrap and guide the scrap in a sliding manner along a predetermined advance direction, compaction means adapted to compact the scrap into the compaction channel, and cutting blades positioned at one axial end of the compaction channel to separate the compacted scrap into portions, wherein the compaction means comprise:

two mutually opposed jaws pivotally connected to the machine body at axes of rotation parallel to each other, both of the axes of rotation are perpendicular to the bottom plane and orthogonal to the advance direction of the scrap, and actuating members configured to rotate said jaws around the respective axes of rotation, in opposite directions, between an open configuration and a closed configuration, thereby reducing space between the two jaws, wherein each jaw comprises an operating surface adapted to laterally delimit the compaction channel when the jaw is in the open configuration, and wherein a cross section of said operating surface, carried out with respect to a section plane orthogonal to the axis of rotation, comprises an end proximal to the axis of rotation, an end distal from the axis of rotation and at least one first rectilinear stretch that is parallel to the advance direction of the scrap when the jaw is in the closed configuration, wherein the cross section of the operating surface comprises a further rectilinear stretch that extends from the first rectilinear stretch to the proximal end of the cross section of the operating surface, wherein an extreme point of said first rectilinear stretch with respect to the axis of rotation of the jaw does not coincide with the distal end of the cross section of the operating surface but is aligned to the distal end along a direction of alignment which forms, with said first rectilinear stretch, a convex angle having a vertex facing an inner part of the compaction channel.

2. The shear press according to claim 1, wherein the cross section of the operating surface comprises a second rectilinear stretch extending along said direction of alignment, from the extreme point of the first rectilinear stretch to the distal end of the cross section of the operating surface.

3. The shear press according to claim 1, wherein the cross section of the operating surface comprises a concave profile with concavity facing towards the inner part of the compaction channel, from the extreme point of the first rectilinear stretch to the distal end of the cross section of the operating surface.

4. The shear press according to claim 3, wherein said concave profile comprises at least two rectilinear stretches which are mutually inclined.

5. The shear press according to claim 4, wherein one of said at least two rectilinear stretches extends in a direction parallel to the first rectilinear stretch.

6. The shear press according to claim 4, wherein one of said at least two rectilinear stretches extends perpendicular to the first rectilinear stretch.

7. The shear press according to claim 1, wherein the angle formed by the first rectilinear stretch and by the direction of alignment joining the extreme point of the first rectilinear stretch and the distal end of the cross section of the operating surface is comprised between 160° and 170°.

8. The shear press according to claim 1, wherein a distance between the extreme point of the first rectilinear stretch and the distal end of the cross section of the operating surface is smaller than the length of the first rectilinear stretch.

9. The shear press according to claim 1, wherein the further rectilinear stretch is parallel to the advance direction of the scrap when the jaw is in open configuration.

10. The shear press according to claim 9, wherein the first rectilinear stretch and said further rectilinear stretch are mutually inclined by an angle of between 145° and 155°.

11. A shear press for scrap comprising a machine body defining a compaction channel adapted to contain the scrap and guide it in a sliding manner along a predetermined advance direction, compaction means adapted to compact the scrap into the compaction channel, and cutting blades positioned at one axial end of the compaction channel to separate the compacted scrap into portions, wherein the compaction means comprise:

two mutually opposed jaws pivotally connected to the machine body at axes of rotation parallel to each other and orthogonal to the advance direction of the scrap, and actuating members configured to rotate said jaws around the respective axes of rotation, in opposite directions, between an open configuration and a closed configuration, thereby reducing a space between the two jaws, wherein each jaw comprises an operating surface adapted to laterally delimit the compaction channel when the jaw is in the open configuration, and wherein a cross section of said operating surface, carried out with respect to a section plane orthogonal to the axis of rotation, comprises an end proximal to the axis of rotation, an end distal from the axis of rotation and at least one first rectilinear stretch that is parallel to the advance direction of the scrap when the jaw is in the closed configuration, wherein the cross section of the operating surface comprises a further rectilinear stretch that extends from the first rectilinear stretch to the proximal end of the cross section of the operating surface, wherein an extreme point of said first rectilinear stretch with respect to the axis of rotation of the jaw does not coincide with the distal end of the cross section of the operating surface but is aligned to the distal end along a direction of alignment which forms, with said first rectilinear stretch, an angle having its vertex facing an inner part of the compaction channel, wherein the cross section of the operating surface comprises a concave profile extending, with concavity facing towards the inner part of the compaction channel, from the extreme point of the first rectilinear stretch to the distal end of the cross section of the operating surface.

12. The shear press according to claim 11, wherein said concave profile comprises at least two rectilinear stretches which are mutually inclined.

13. The shear press according to claim 12, wherein one of said at least two rectilinear stretches extends in a direction parallel to the first rectilinear stretch.

14. The shear press according to claim 12, wherein one of said at least two rectilinear stretches extends perpendicular to the first rectilinear stretch.

* * * * *